United States Patent [19]

Luther

[11] Patent Number: 4,881,891

[45] Date of Patent: Nov. 21, 1989

[54] MOLD SIDE WALL LOCKING APPARATUS

[75] Inventor: LeRoy D. Luther, Brookfield, Wis.

[73] Assignee: Triangle Tool Corporation, Milwaukee, Wis.

[21] Appl. No.: 296,184

[22] Filed: Jan. 11, 1989

[51] Int. Cl.⁴ ............................................. B29C 45/66
[52] U.S. Cl. ................................ 425/556; 425/450.1; 425/451.7; 425/573; 425/577; 425/589; 425/DIG. 58
[58] Field of Search ................... 425/450.1, 451.7, 573, 425/577, 589, 595, 556, DIG. 58

[56] References Cited

U.S. PATENT DOCUMENTS

| | | | |
|---|---|---|---|
| 3,373,460 | 3/1968 | Ladney, Jr. | 425/416 |
| 3,473,197 | 10/1969 | Wilds et al. | 425/577 |
| 3,509,603 | 5/1970 | Halsall et al. | 425/577 |
| 3,608,133 | 9/1971 | Cyriak et al. | 425/577 |
| 3,816,047 | 6/1974 | Mohler | 425/577 |
| 3,838,960 | 10/1974 | Lovejoy | 425/241 |
| 3,905,740 | 9/1975 | Lovejoy | 425/438 |
| 3,930,780 | 1/1976 | Lovejoy | 425/556 |
| 3,977,821 | 8/1976 | Lovejoy | 425/570 |
| 4,206,799 | 6/1980 | McDonald | 425/451.9 |
| 4,278,417 | 7/1981 | Wilds et al. | 425/577 |
| 4,362,291 | 12/1982 | Fuke et al. | 249/144 |
| 4,583,933 | 4/1986 | Woelfel et al. | 425/330 |
| 4,678,158 | 7/1987 | Brock | 249/161 |

Primary Examiner—Jay H. Woo
Assistant Examiner—Timothy W. Heitbrink
Attorney, Agent, or Firm—Michael, Best & Friedrich

[57] ABSTRACT

A mold assembly having a support member which is moveable in a direction of travel both toward and away from an end plate and supporting individual mold side walls which are slideably moveable along a path of travel from a mold open to a mold closed position; and a locking member is selectively moveable into movement restraining relation relative to the individual mold side walls thereby positioning the individual mold sidewalls in the mold closed position.

14 Claims, 4 Drawing Sheets

MOLD SIDE WALL LOCKING APPARATUS

FIELD OF THE INVENTION

The present invention relates to mold assemblies for use in injection molding and more particularly to an apparatus for selectively restraining a mold side wall against movement during a molding operation.

BACKGROUND

In mold assemblies of the type used in injection molding, means must be provided for effectively restraining the mold side walls from outward movement during the injection process wherein fluid pressures are experienced by the mold side walls. Conventional mold assembly apparatus for supporting mold side walls results in requirements of long molding machine strokes and reduces the speed and efficiency at which the molding machine can operate. Further, manufacturers have sought mold assembly design for supporting the side walls which permits use of reduced clamping pressures thereby permitting the molding process to be accomplished in a less costly molding machine.

Another deficiency common with respect to the prior art molding devices results from characteristics inherent in their design inasmuch as these devices have generally been incapable of precisely positioning the molded article in a predetermined position following the molding operation. Accordingly, it has been difficult to grip the molded article by robots or other remotely controllable devices.

SUMMARY OF THE INVENTION

Therefore, it is an object of the present invention to provide an improved restraining apparatus for a molding machine having improved means for restraining the mold side walls.

Another object of the present invention is to provide a mold assembly which permits use of less clamping pressure to restrain the mold side walls against outward movement during the molding operation.

Another object of the present invention is to provide a mold assembly which facilitates a shorter mold stroke and use of smaller molding machines.

Another object of the present invention is to provide a mold assembly which can support a molded article in a precise location relative to the molding machine thereby facilitating the engagement of the molded article by a robot or other remotely controllable devices.

Another object of the present invention is to provide a molding machine which is characterized by reduced maintenance, ease of operation, and which is operable to reduce the molding costs.

These and other objects and advantages are achieved in the apparatus of the subject invention wherein, in the preferred embodiment, a molding machine includes a moveable support member for supporting a mold side wall for movement along a predetermined path of travel from a mold open position to a mold closed position, and a locking member is supported by the support member and is selectively moveable into movement restraining relation relative to the mold side wall when the mold side wall is disposed in the mold closed position.

DESCRIPTION OF THE PREFERRED EMBODIMENT

Figure 1:
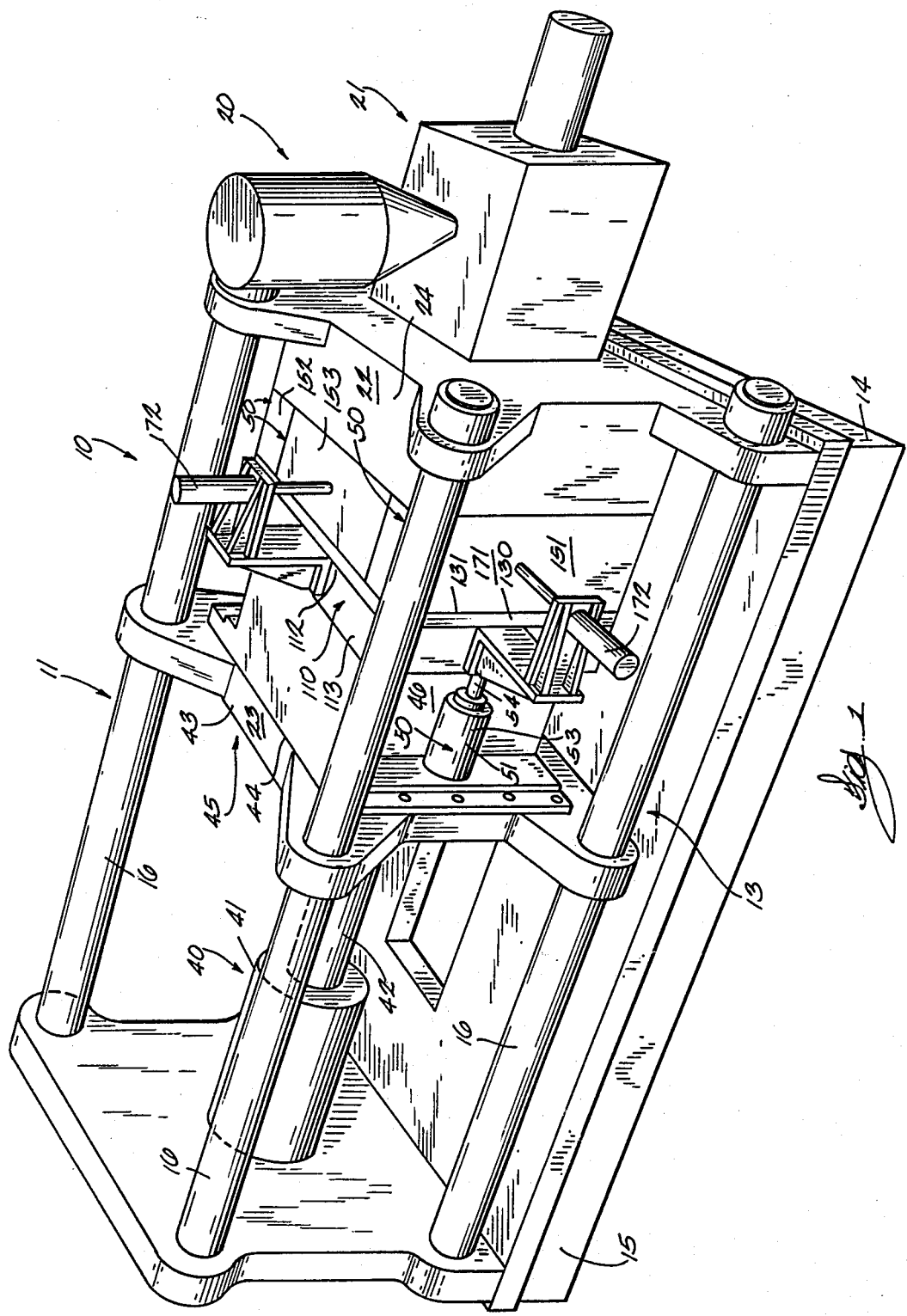
FIG. 1 is a perspective view of the apparatus of the subject invention shown in a typical operative environment.

Referring more particularly to the drawings, a molding assembly embodying the invention is generally indicated by the numeral 10 in FIG. 1. For illustrative convenience the mold assembly 10 is depicted as it would be supported in a molding machine 11. The molding machine 11 has a base member 13, which has first and second ends 14 and 15 respectively. Affixed in close proximity to the first end 14 of the base member is a plastic injection mechanism 20 of the type well known by those skilled in the art, and which is operable to inject plastic at the desired temperature, into a mold cavity. The plastic injection mechanism is disposed in fluid communication with a heating assembly 21 which is operable to heat the plastic from the ambient environmental temperature to the molding temperature. The injection mechanism is positioned or otherwise disposed in fluid communication with a first platen or mold end plate which is generally indicated by the numeral 22, and which is supported on the base member in a predetermined fixed location. Further, a second platen or end plate 23 is slideably supported on the second end 15 of the base and is operable selectively to move along the base member in a direction both toward or alternatively away from, the first end plate depending upon the operational conditions. As best illustrated by reference to FIG. 1, the second end plate 23 moves in a path of travel which is substantially parallel to the longitudinal axis of the base 14. Spaced apart parallel tie bars 16 individually interconnect the first end plate with the second end plate, the tie bars 16 supporting the second end plate for reciprocal movement toward and away from the first end plate in a manner well understood by those skilled in the art.

The first end plate 22 has a main body 24 with an outside or exterior facing surface 25, and an interior or inwardly facing surface 26 which functions as a portion of the mold cavity. Further a fluid passageway 30 is formed in the main body 24 and is disposed in fluid communication with the heating assembly 21, and with a plurality of outlet nozzles 31 which are integral with the first end plate 22 and which are individually operable to discharge the heated resin into the mold cavity. The interior surface 26 has formed therein a first recessed area 32 and a second recessed area 33 of substantially smaller dimension. The individual recessed areas are defined by first and second side walls which are indicated by the numerals 34 and 35 respectively. As best illustrated by reference to FIG. 1 a hydraulic motor 40 is affixed on the second end 15 of the base member 13 and is operable selectively to urge the second end plate 23 along the tie bars 16 in a direction toward or alternatively away from the first end plate 22. The hydraulic motor includes a cylinder 41 and a piston 42. One end of the piston is fixed to the main body 43 of second end plate, the main body 43 having both forward and rearward surfaces 44 and 45, and first and second sidewalls 46, and 47 respectively.

Figure 2:
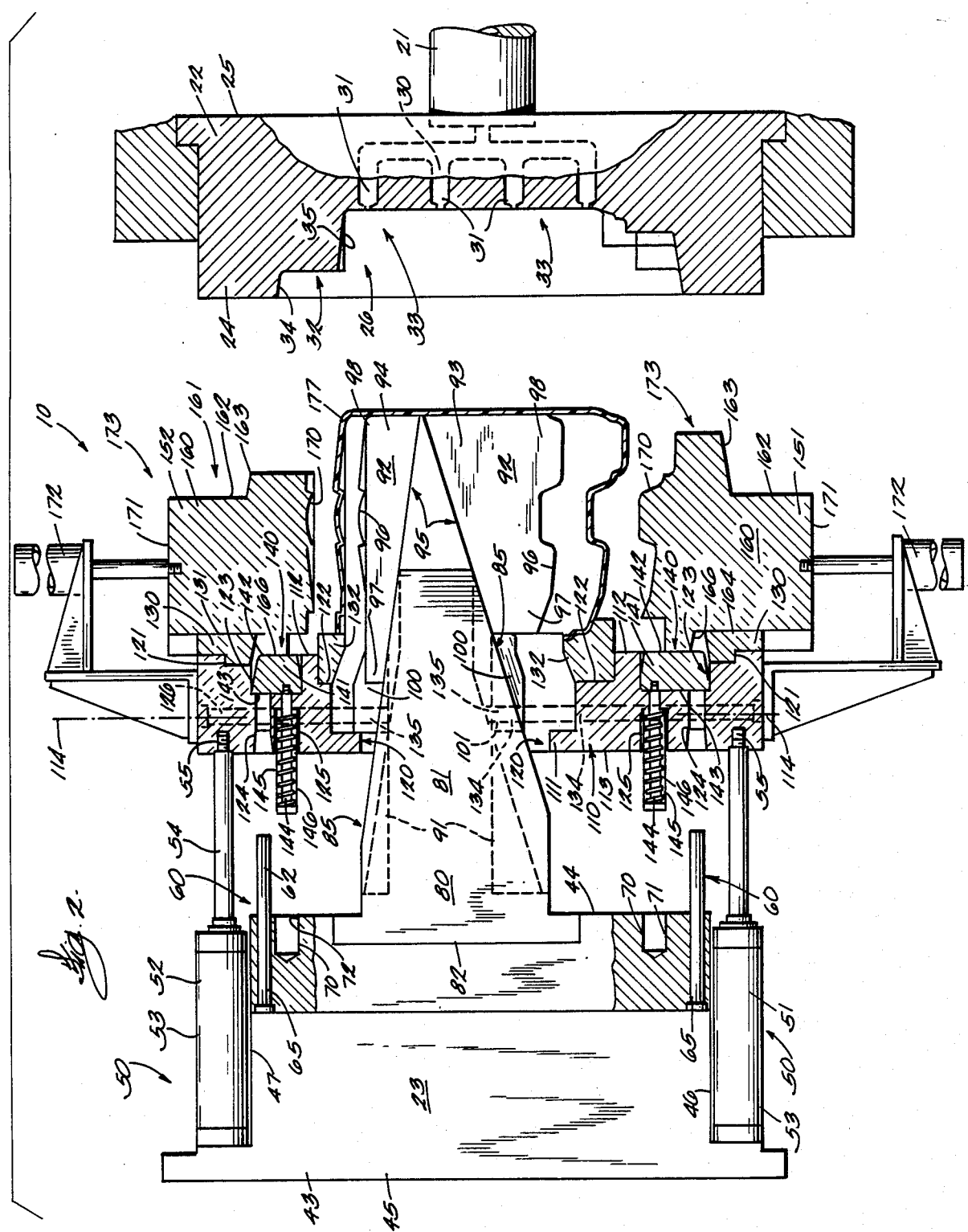
FIG. 2 is a fragmentary, top plan view of the present invention, with some supporting surfaces removed, and showing the mold side walls disposed in the mold open position.

As most clearly illustrated by reference to FIG. 2 the main body 43 of the second end plate 23 supports a pair of hydraulic cylinders 50 which are disposed in close proximity to first and second sidewalls 46 and 47, respectively. A pair of hydraulic cylinders 51 and 52 each have a cylinder portion which is connected in fluid communication with a source of hydraulic fluid under pressure, not shown, and extendable portions or rams 54. Each of the rams 54 have a threaded end 55 of reduced dimension. A plurality of shafts 60, hereinafter designated as first, second, third, and fourth shafts 61, 62, 63 and 64 are mounted on the main body 43. Each of the shafts 60 have an elongated main body 65 disposed in an attitude substantially parallel to the longitudinal axis of the base member 13. Further, a plurality of passageways 70 including a first, second, third and fourth passageway 71, 72, 73 and 74, respectively, are formed in the forwardly facing surface 44 of the second end plate.

Figure 3:
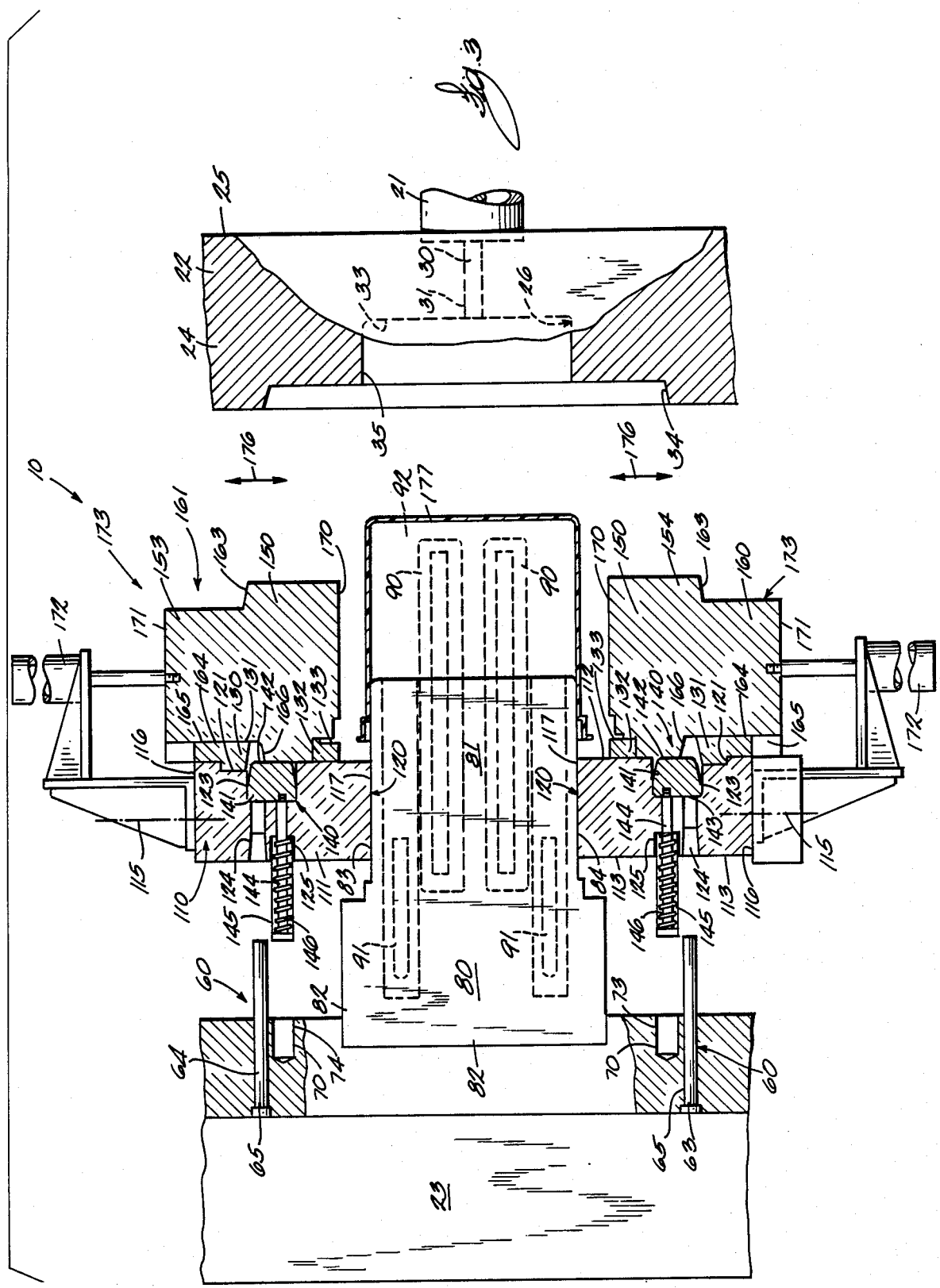
FIG. 3 is a partial, side elevation view of the apparatus of the subject invention taken along line 3—3 of FIG. 2, with some supporting surfaces removed.

A fixed core member 80, is mounted substantially centrally of the second end plate 23, and has a main body 81 with a base portion 82 affixed to the forwardly facing surface 44 of the second end plate, and a top and bottom surface 83 and 84, respectively. As best illustrated in FIG. 3, the top and bottom surfaces are disposed in substantially mutually parallel relation and are further disposed in a substantially normal attitude with respect to the forwardly facing surface 44. Further, the fixed core member has a pair of angulated substantially converging sidewalls 85, which gives the fixed core member a generally frusto-triangular like appearance as that is depicted in the plan view of FIG. 2. A pair of dovetailed tracks 90 are affixed, using conventional fasteners, on each of the angulated sidewalls, the pair of tracks 90 being disposed in substantially parallel spaced relation one to the other, and with respect to the top and bottom surfaces 83 and 84 respectively. A pair of channels 91 individually are formed in each of the angulated sidewalls and are disposed in predetermined substantially parallel spaced relation with the top and bottom surfaces 83 and 84 respectively. This is best illustrated by reference to FIG. 3.

A pair of moveable core members 92, which include first and second core members 93 and 94, respectively, are supported slideably on the fixed core member 80. Each of the core members have inwardly and outwardly disposed surfaces 95 and 96, and proximal and distal ends 97 and 98 respectively. As best illustrated by reference to FIG. 2 and 3, the top and bottom surfaces 83 and 84, as well as the outwardly disposed surfaces 96 of each of the core member 93 and 94, forms one of the several walls which defines the molding cavity. The inwardly disposed surfaces 95 of each of the moveable core members 92 has formed therein a pair of dovetailed channels, not shown, which are conformably dimensioned slideably to mate with the dovetailed tracks 90 which are mounted on each of the angulated sidewalls 85. This mechanical arrangement permits the moveable core member 92 to move along the fixed core member 80 into converging or alternatively diverging relation one to the other. These relationships are best understood by a study of FIG. 2. A pair of guide members 100 individually are borne on each of the moveable core members 92 and are disposed at the proximal end thereof. Each guide member has an orifice 101 formed therein.

The mold assembly 10 also includes a moveable mold member or support member 110. The support member 110 has a main body 111 with a forwardly facing surface 112, and a rearwardly facing surface 113. As best seen by reference to FIGS. 2 and 3, the main body 111 has a longitudinal axis generally indicated by line 114 and a transverse axis indicated by line 115. Further, the main body has an outside peripheral edge 116, and an inside peripheral edge 117. As best illustrated by reference to FIG. 2, the inside peripheral edge 117 defines a substantially centrally disposed passageway or channel 120 adapted to slideably receive the fixed core member 80. More particularly, and as best illustrated by reference to FIG. 2, the centrally disposed passageway is operable to permit lateral movement of the moveable core members 92 in a direction substantially transversely of the longitudinal axis of the base member 13 and in a path of travel substantially parallel to the longitudinal axis 114 of the main body 111.

As illustrated most clearly by reference to FIG. 3, the centrally disposed passageway 120 closely holds the core member 80 and in particular is disposed in close proximity to the top and bottom surfaces 83 and 84 thereof. As best seen by reference to FIG. 2, the support member 110 has an outwardly disposed recessed area or cavity 121 which is formed in close proximity to the outside peripheral edge 116, and an inwardly disposed recessed area or cavity 122 which is formed in close proximity to the inside peripheral edge 117. A plurality of cavities or receiving stations 123, individually are formed in predetermined locations in the main body 111 of the support member 110, and are disposed in communication with the forwardly facing surface 112 thereof. Further, first and second channels 124 and 125, individually connect each of the receiving stations 123 with the rearwardly facing surface 113. Each of the first channels 124 are positioned in substantially coaxial alignment with one of the several shafts 60, and the individual second channels 125 are disposed in substantially coaxial alignment with one of the several passageways 70. Movement of the support member 110 toward or into engagement with the second end plate 23 causes the shafts 60 to be slideably received in one of the first passageways 124. This relationship is most clearly shown by reference to FIG. 4. The main body 111 of the support member 110 has formed therein a pair of discontinuous passageways or channels 126 which are disposed in a position substantially along the longitudinal axis 114. This relationship is most clearly shown by reference to FIG. 2.

A first or outwardly disposed plate member 130, is disposed in close proximity to the outside peripheral edge 116 of the support member 110, the outwardly disposed plate member 130 having a forwardly facing supporting surface 131. Further, a second or inwardly disposed plate member, which is generally indicated by the numeral 132 defines a forwardly facing supporting surface 133. As best illustrated by reference to FIGS. 2 and 3, a pair of discontinuous, substantially elongated members 134 are individually slideably received in each of the third channels or passageways 126. The elongated members 134 each have an end 135 slideably received in the orifice 101 formed in the individual guide members 100. As should be understood by a comparison of FIGS. 2 and 4, and upon movement of the support member 110 in a direction toward the second end plate 23, the members 134 have the effect of urging each of the moveable core members 92 in diverging relation relative to one another and along the fixed core member 80. This diverging movement of the individual core members has the effect of causing the moveable core members to move substantially laterally relative to the longitudinal axis of the base member 13. Alternatively, when the support member is urged away from the second end plate 23, the moveable core members 92 are urged in converging relationship toward one another. This relationship is best illustrated by reference to FIG. 2. In this fashion, the moveable core members can be substantially collapsed, that is, moved away from the molded article to facilitate removal of the molded article from the moveable core members.

As best illustrated by reference to FIGS. 2 and 3, a plurality of locking assemblies are generally indicated by the numeral 140, and include individual locking members 141. Each of the locking members have a forwardly facing surface 142 and a rearwardly facing surface 143. Further, a guide rod 144 is threaded into the rearwardly facing surface. The individual guide rods conformably are dimensioned for slideable mating receipt in each of the second channels 125 disposed in positions substantially transversely of the support member 110. As earlier discussed, the second channels 125 are individually disposed in substantially coaxial alignment with one of the several passageways 71 through 74, respectively, which are individually formed in the forwardly facing surface 44 of the second end plate 23. Further, a plurality of cylinders, generally indicated by the numeral 145, are borne by the support member 110 and are adapted to slideably receive the individual guide rods. A compression spring 146 is slideably received in each of the cylinders and is disposed in force transmitting relation relative to each guide rod. The individual compression springs are operable to bias each of the guide rods in a direction toward the second end plate 23. When the support member 110 is urged toward or into engagement with the second end plate, the cylinder and the guide rod are slideably received in the individual passageways 71 through 74 which are formed in the second end plate. Further, the compression spring 146 is compressed when the individual shafts 61, 62, 63 and 64 engage the individual locking members 141 thereby causing them to be moved from their recessed position in the receiving stations 123 to an extended position where they engage the individual mold side walls. These relationships are illustrated most clearly in FIGS. 2 and 4.

Figure 4:
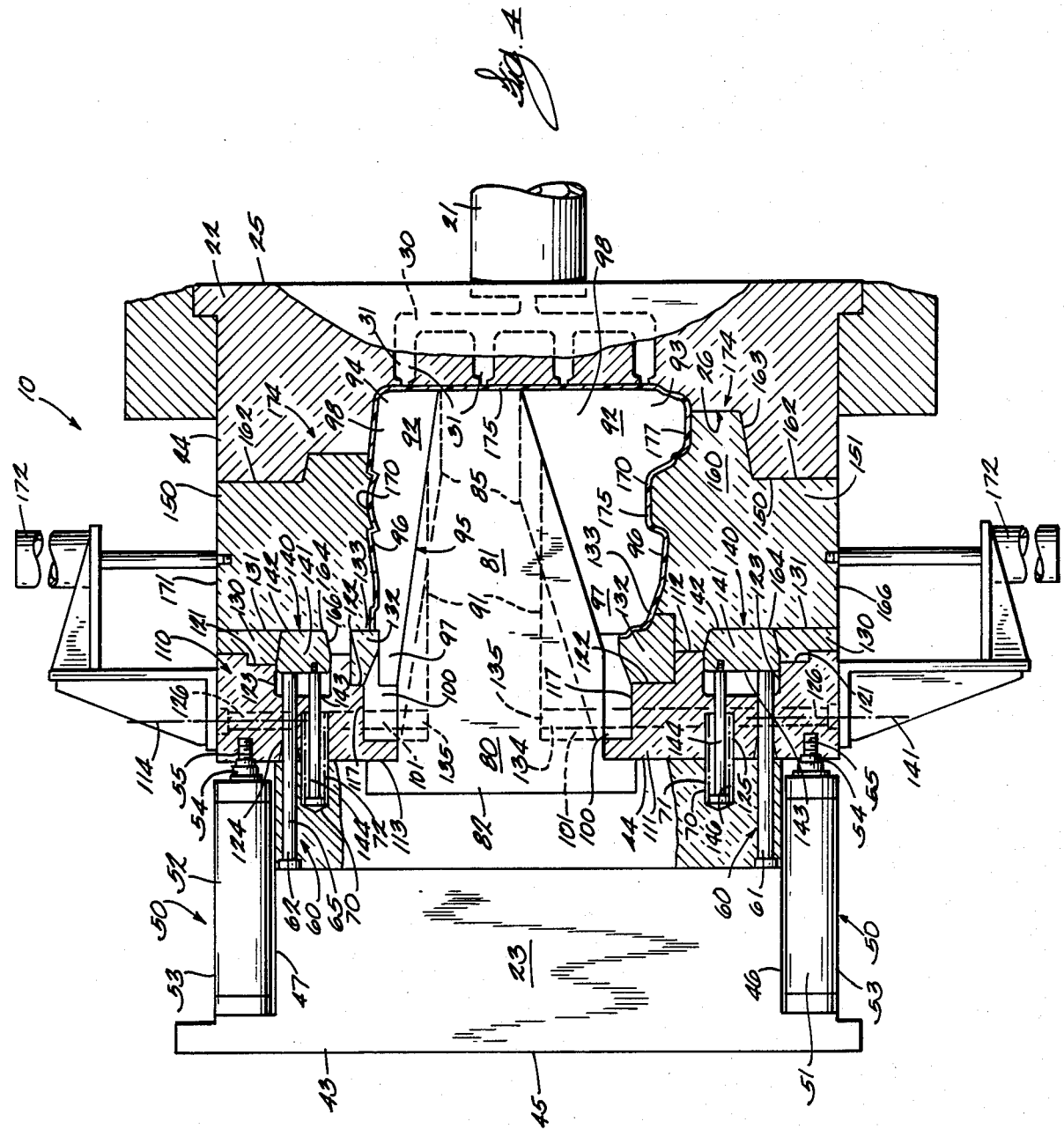
FIG. 4 is a fragmentary, top plan view of the apparatus of the subject invention and showing the mold side walls in the mold closed position.

The apparatus 10 includes a plurality of mold side walls which are generally indicated by the numeral 150, and including first, second, third and fourth mold side walls 151, 152, 153 and 154, respectively. Each of the mold side walls has a main body 160, which defines a forwardly facing surface 161. The forwardly facing surface of each mold side wall has a recessed area 162 formed therein. As best shown in FIG. 4, the recessed area, which is defined by an angulated side wall 163 is operable when the mold side walls are disposed in the mold closed position, to fit into interlocking or mating relation with the first end plate 22, that is, the side wall 163 is disposed in locking relation against the first side wall 34 which is defined by the first recessed area 32. Further, the individual mold side walls have a rearwardly facing surface 164 which has formed therein a cavity 165 which defines a wall 166. As best illustrated by reference to FIGS. 2 and 3, the individual cavities 165 slideably receive the outwardly disposed plate 130. The wall 166 further operates to inhibit movement of the individual mold side walls, the wall 166 defining a mold open position for each of the mold side walls.

As best illustrated by reference to FIGS. 2 and 3, the mold side walls 150 each have a molding surface 170 and an outwardly disposed surface 171. A plurality of hydraulic cylinders and their associated extendable portions or rams 172 are supported by the support member 110 and cause movement of the mold side walls between the mold open and mold closed positions 173 and 174. As shown most clearly by reference to FIG. 4, when the individual mold side walls are disposed in the mold closed position, a mold cavity 175 is formed. The path of travel of the individual mold plates is indicated by the line labeled 176.

OPERATION

In operation of the mold assembly embodying the invention, the mold plates 150 are individually movable along a path of travel 176 between a mold open position 173, and a mold closed position 174. To begin the process of forming a molded article 177, the second end plate 23 is moved in a direction toward the fixed, first end plate 22 by the hydraulic cylinder 40. As the second end plate is urged toward the first end plate, the individual hydraulic cylinders 172 are selectively actuated thereby causing the mold side walls 150 to move from the mold open position 173 toward the mold closed position 174. Substantially simultaneous with this movement of the individual mold side walls toward the mold closed position, the individual hydraulic cylinders 50 are actuated thereby causing the rams 54 to retract. This retraction of the rams 54 causes the support member 110 to move in a direction towards the second end plate 23. As the support member 110 proceeds in a direction toward the second end plate, the moveable core members 92 are urged along the fixed core member 80 and are thereby moved outwardly.

As the support member 110 moves into close proximity to the second end plate 23, the individual shafts 61 through 64 are received in each of the first channels 124. As the support member 110 nears engagement with the second end pate 23, the individual shafts engage the rearwardly facing surfaces 143 of each of the locking members 141 thereby urging each of the locking members from their recessed or retracted positions to an extended position whereby they are each disposed in movement restraining relation and in a position substantially right angularly related to the individual mold side walls 150. When the individual locking members are disposed in the extended position, the guide rod 144 caused the compression spring 146 to be compressed. As best illustrated by reference to FIG. 4, when the individual mold plates are disposed in the mold closed position, the locking members, in combination with the first end plate 22 are operable to inhibit outward movement of the individual mold plates from the mold closed position.

Upon completion of the molding process, the piston 42 urges the second end plate 23 in a direction away from the first end plate 22. When the individual mold side walls 150 disengage from the first end plate, the apparatus 10 is operable selectively to actuate the pair of hydraulic cylinders 50 thereby causing the rams 54 to extend and thus move the support member 110 away from the second end plate. As this movement of the support member continues, the individual shafts 60 are operable to disengage from the individual locking member 141, and the compression springs 146 are operable to move the locking members from the extended position to the recessed position which is substantially internally of the individual receiving stations 123. The hydraulic cylinders 172 are then operable selectively to retract thereby causing the individual mold plates 150 to move from the mold closed positions, to the mold open positions. Further, the movement of the support member away from the second end plate causes the moveable core members 92 to move into converging relation one with the other. This permits the molded article to be removed easily from the molding machine 11.

It should be understood that the individual hydraulic cylinders 172 are sequentially operable such that they may be utilized precisely to position the molded articles 176 relative to the mold assembly 10 and to permit a robot or other remotely controllable device to locate the molded article such that it may be readily removed from the molding machine 11.

Therefore, the apparatus of the subject invention affords the capability of having one or more mold side walls which can be adjusted relative to a path of travel for the performance of a specific work operation, and which can be easily and conveniently readjusted for selected operations. The apparatus further includes a locking assembly which is operable selectively to position the mold side walls in a predetermined position relative to the path of travel, the apparatus being a fully operable apparatus which is capable of performing all the molding operations of the type heretofore described thereby eliminating many of the shortcomings inherent in the prior art practices and devices. The apparatus of the subject invention being of both sturdy and dependable construction and being relatively easy to maintain.

Although the invention has been herein shown and described in what is conceived to be the most practical and preferred embodiment, it is to be recognized that departures may be made therefrom within the scope of the invention which is not to be limited to the illustrative details disclosed.

I claim:

1. Apparatus for use in a mold assembly and for selectively restraining a mold side wall against movement away from a molding position, and the mold assembly including an end plate, the apparatus comprising:
   a support member selectively moveable along a first path of travel toward and away from the end plate, said support member supporting the mold side wall for slideable movement along a second path of travel substantially perpendicular to the first path of travel and between a mold open position and a mold closed position;
   means for moving the support member along the first path of travel toward and away from the end plate; and
   a locking member carried by the support member, said locking member being supported for movement with respect to the support member between a retracted position wherein the mold side wall is movable along the second path of travel with respect to the support member and an extended position wherein said locking member is operable to restrain movement of the mold side wall away from the mold closed position when the support member is moved toward the end plate, and releasing the mold side wall for slideable movement toward the mold open position when the support member is moved away from the end plate.

2. The apparatus of claim 1 further including means for moving the mold side wall between the mold open position and the mold closed position.

3. The apparatus of claim 1 wherein the means for moving the support member is mounted on the end plate and includes at least one hydraulic cylinder connected to the support member and linearly extendable to position the support member in spaced relationship with respect to the end plate, and when contracted causing the support member to move to a position adjacent the end plate.

4. The apparatus of claim 3 wherein the support member includes a mold side wall supporting surface, the side wall supporting surface including a recess, the locking member being supported for movement between a mold side wall engaging position and a retracted position wherein the locking member is slideably housed in the recess, and the mold side wall being freely movable to the mold open position.

5. The apparatus of claim 4 further including means for causing movement of the locking member from the retracted position to the mold side wall engaging position when the support member is moved to a position adjacent the end wall.

6. The apparatus of claim 5 wherein the means for causing movement of the locking member includes a shaft mounted on the end plate and projecting from the end plate in the direction of movement of the support plate with respect to the end plate, the shaft being engageable when the support member is moved toward the end plate with the locking member to thereby move the locking member from the retracted position to the mold side wall engaging position.

7. The apparatus of claim 6 further including means for urging the locking member toward the retracted position, the means for urging including a guide rod supported by the locking member, and a compression spring supported by the support member and disposed in a force transmitting relation to the guide rod, the compression spring being placed in compression when the locking member is moved to the mold side wall restraining position and causing the locking member to be urged to the retracted position when the support member is moved away from the end plate.

8. Apparatus for use in a mold assembly for selectively restraining movement of a mold side wall, the apparatus comprising
   a moveable end plate adapted to be supported by a molding machine
   a support member mounted on the end plate, said support member being selectively moveable into and out of engagement with the moveable end plate and supporting the mold side wall for slideable movement therewith, the support member defining a predetermined path of travel for the mold side wall;
   moving means carried by the end plate for moving the support member into and out of engagement with the end plate;
   driving means supported by the support member for driving the mold side wall along the path of travel and into a predetermined operative attitude relative to the support member; and a locking member supported by the support member, said locking member being selectively moveable into restraining relation relative to the mold side wall when the support member is urged into engagement with the end plate, the locking member restraining movement of the mold side wall when the locking member is moved into said restraining relation.

9. The apparatus of claim 8 wherein the means for moving the support member includes a hydraulic cylinder supported on the end plate and which is mounted on the support member, the hydraulic cylinder, upon contraction selectively moving the support member towards the end plate, and upon extension positioning the support member in predetermined spaced relation to the end plate; and the mold side wall being operable to move along the path of travel from a mold open to a mold closed position.

10. The apparatus of claim 9 wherein the means for driving the mold side wall along the path of travel from the mold open to the mold closed positions includes a hydraulic cylinder which has an extendable portion which is mounted on the mold side wall, the hydraulic cylinder urging the mold side wall from the mold open to the mold closed position when the support member is moved into engagement with the end plate and further moving the mold side wall from the mold closed position to the mold open position when the support member is moved out of engagement with the end plate.

11. The apparatus of claim 10 wherein the support member has forwardly and rearwardly disposed surfaces and a longitudinal axis, and a receiving station formed in the support member and disposed in communication with the forwardly disposed surface, the receiving station conformably dimensioned slideably to receive the locking member, and a first channel formed in the support member and disposed transversely of the longitudinal axis and between the rearwardly disposed surface and the receiving station, and the locking member moveable along a substantially transversely disposed path of travel from a recessed position wherein the mold plate is free to move along the path of travel, to an extended position, wherein the locking member engages the mold plate thereby inhibiting further movement of the mold plate along the path of travel.

12. The apparatus of claim 11 wherein the end plate supports a shaft having an elongated main body disposed in substantially coaxial alignment with the first channel, and the shaft being slideably received in the first channel when the support member is urged into engagement with the end plate, the shaft engaging the locking member and urging the locking member from the recessed position to the extended position.

13. The apparatus of claim 12 wherein a second channel is formed in the support member and disposed transversely of the longitudinal axis and between the rearwardly disposed surface and the receiving station, and a guide rod mounted on the locking member and disposed in slideable mating receipt in the second channel, and a biasing means for biasing the guide rod in a direction towards the end plate supported by the support member, said biasing means including a compression spring which is supported on the support member and which engages the guide rod, the compression spring urging the locking member into the recessed position when the support member is disposed in spaced relation to the end plate, and being placed into a state of compression when the locking member is urged from the recessed position into the extended position by the shaft.

14. A mold assembly comprising
a mold end plate;
a moveable mold member supported for movement toward and away from the mold end plate, the movable mold member including a cavity;
means for causing selective movement of the moveable mold member toward and away from the mold end plate;
a mold side wall supported by the moveable mold member for movement between a mold closed position and a mold open position;
means for causing movement of the mold side wall between the mold closed position and the mold open position;
a locking member supported by the moveable mold member for movement between a retracted position wherein the locking member is housed in the cavity in the moveable mold member and an extended locking position wherein the locking member engages the mold side wall to prevent movement of the mold side wall away from the mold closed position;
means for causing movement of the locking member from the retracted position to the extended locking position when the moveable mold member moves toward mold end plate; and
means for causing movement of the locking member to the retracted position when the moveable mold member moves away from the mold end plate.

* * * * *